United States Patent [19]

Watt et al.

[11] 3,783,594
[45] Jan. 8, 1974

[54] HARVESTER PLATFORM SUSPENSION AND LINKAGE SYSTEM

[75] Inventors: J. Donald Watt, Millgrove, Ontario; Herbert W. Molzahn, Hamilton, Ontario, both of Canada

[73] Assignee: International Harvester Company, Chicago, Ill.

[22] Filed: Sept. 18, 1972

[21] Appl. No.: 289,912

[52] U.S. Cl. .................................. 56/15.8, 56/208
[51] Int. Cl. ............................................ A01d 35/14
[58] Field of Search.................. 56/10.2, 14.7, 14.9, 56/15.1, 15.2, 15.7, 15.8, 15.9, 208

[56] References Cited
UNITED STATES PATENTS
3,363,407 1/1968 Drummond.......................... 56/15.8
3,266,230 8/1966 Rowbotham.......................... 56/208

Primary Examiner—Antonio F. Guida
Attorney—Floyd B. Harman and Neal C. Johnson

[57] ABSTRACT

A self-propelled windrower having a wheeled frame and a harvester platform disposed forwardly of the frame for cutting a standing crop and depositing the crop onto the ground in a windrow. The platform is mounted on the frame by a central ball and socket joint permitting radial float. The platform is movable vertically by a pair of hydraulic lift cylinders and is floatably supported by coil springs disposed on the cylinder units. A stabilizer bar prevents undesirable swinging of the platform about a vertical axis. The platform is of the type wherein the location of the drive system components contributes to an asymmetrical center of gravity. A balancing spring is connected between the frame and the platform to counter the effect of the asymmetrical center of gravity.

9 Claims, 5 Drawing Figures

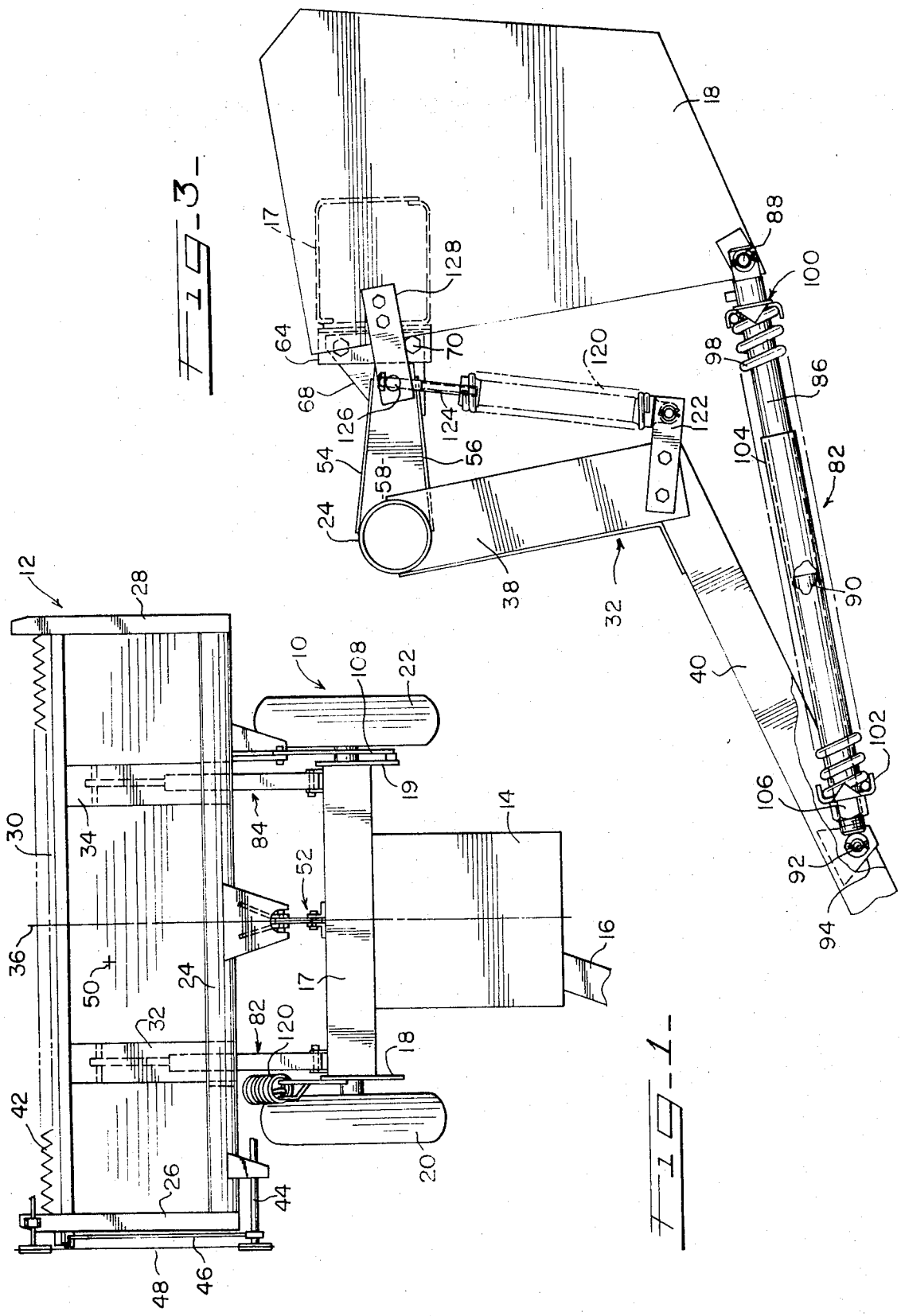

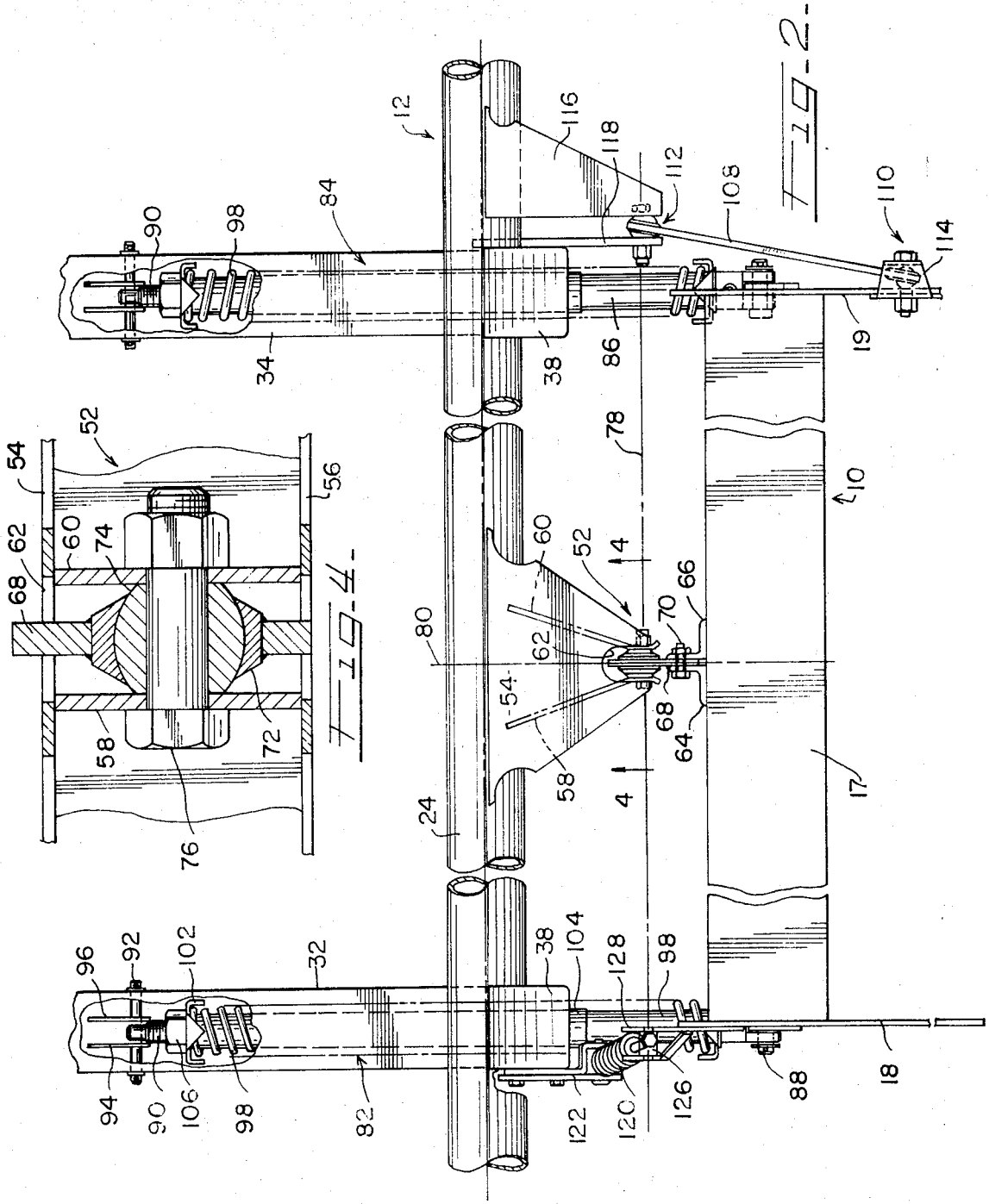

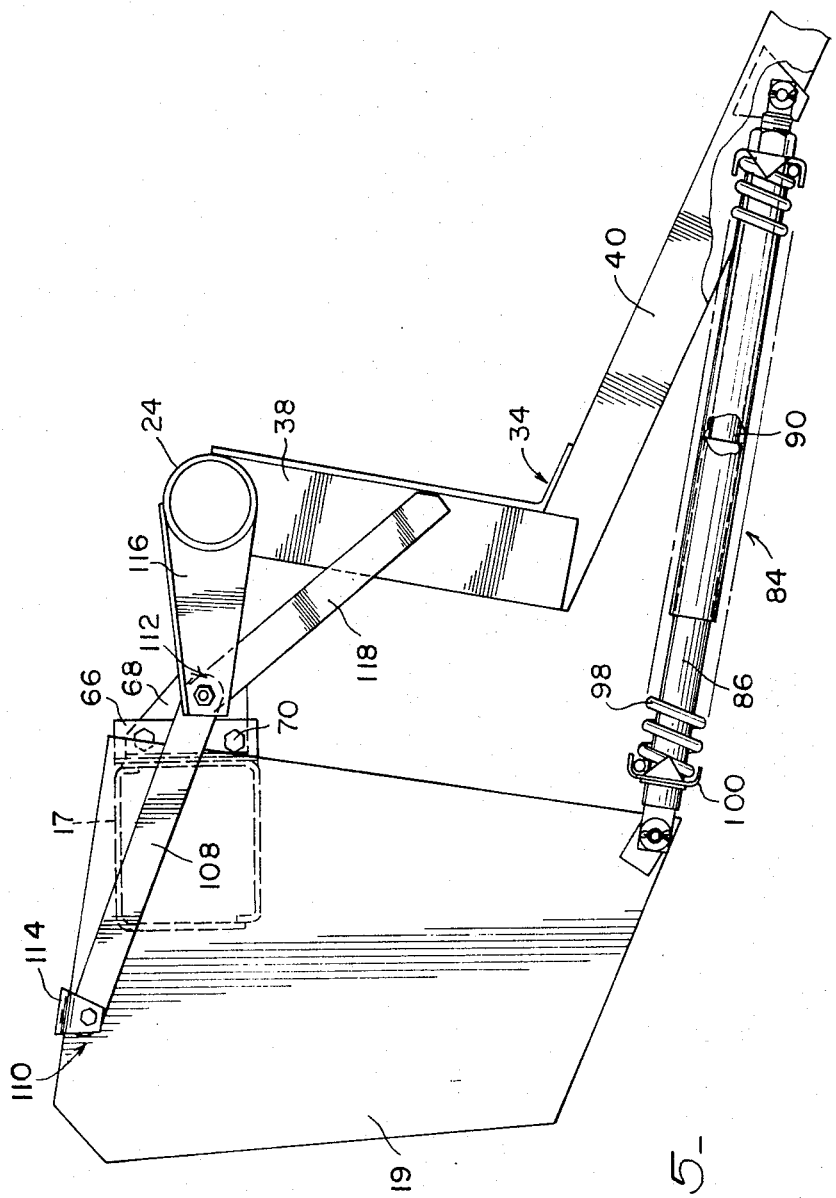

HARVESTER PLATFORM SUSPENSION AND LINKAGE SYSTEM

BACKGROUND OF THE INVENTION

1. Field of the Invention

The invention relates generally to harvesting machines of the type which cut a standing crop and convey the same into a windrow on the ground. More particularly the invention relates to an improved system for floatably suspending a harvester platform from a wheeled frame or chassis.

2. Prior Art

The harvester platforms of windrowers, for example, include a plurality of power driven crop handling components including a cutter, a reel, and conveyors. Frequently the platform may include crop conditioning rolls as well. With this many components to be accommodated on the platform, and with the requirement that power-transmitting elements be accommodated as well, it is seldom the case that the center of gravity of the platform will be disposed on the center line of the platform.

The resultant asymmetrical center of gravity creates problems in the design and operative adjustment of the system for floatably supporting the platform. Ordinarily the platform is symmetrically disposed relative to the supporting chassis or framework. For example, in a self-propelled windrower the center line of the platform will coincide with the center line of the chassis. The end of the platform closest to the center of gravity will, during operation, engage the ground with greater force than will the other end. Moreover, the asymmetrical center of gravity will cause the platform to assume an unlevel attitude end-to-end during raising and lowering by the hydraulic cylinder units. The results of this unbalanced condition are less than optimum floatability of the platform over the ground surface during operation and an unstable condition during raising to and lowering from the transport position.

SUMMARY

The invention provides an improved suspension and linkage system for a harvester platform having its center of gravity offset from the fore-and-aft extending center line of the platform. The system includes a basic three-point support of the platform from the chassis frame as defined by a pair of hydraulic cylinder units and an intermediate ball joint connection at the center line. The three-point suspension permits movement of the platform about longitudinal and transverse axes defined by the ball joint. Stabilizer means are included to prevent movement of the platform in a horizontal plane. Spring means are connected between the chassis frame and the platform to create a lifting force tending to maintain the platform in a level attitude and thus offset the effect of the asymmetrical center of gravity.

Briefly, the objects of the invention are to provide a suspension and linkage system for a harvester platform: which provides requisite floatability of the platform to enable it to adjust its position in response to variation in ground contour; which substantially offsets the problems associated with platforms having assymetrical centers of gravity; and which provides stability of the platform during raising and lowering thereof to and from a transport position.

BRIEF DESCRIPTION OF THE DRAWINGS

FIG. 1 is a fragmentary plan view showing schematically the forward portion of a self-propelled windrower chassis and a crop harvesting platform mounted thereon;

FIG. 2 is an enlarged fragmentary plan view of the suspension and linkage system of the invention;

FIG. 3 is a fragmentary side elevation view of the suspension and linkage system;

FIG. 4 is a fragementary sectional view taken in the direction of arrows 4—4 of FIG. 2; and, FIG. 5 is an enlarged side elevation view of the opposite side of the suspension and linkage system from that shown in FIG. 3.

DESCRIPTION OF PREFERRED EMBODIMENTS

Referring first to FIG. 1 there is shown in schematic form the forward portion of a self-propelled chassis 10 having a crop harvesting platform 12 supported forwardly thereof. The chassis 10 is of conventional construction and includes a central frame portion 14 from which a beam 16 extends diagonally rearwardly for supporting a ground-engaging caster wheel (not shown). The forward portion of the chassis frame includes a box frame section 17 disposed transversely to the normal forward direction of travel. End plates 18 and 19 are secured to the opposite ends of the frame section 17. A pair of ground drive wheels 20 and 22 are suitably supported at opposite ends of the box frame section 17 as shown.

The platform 12 is itself of conventional construction and includes a basic framework consisting of a tubular-section rear beam 24; end sections 26 and 28 extending forwardly from opposite ends of the beam 24; a front beam 30 extending between the sections 26 and 28; and a pair of intermediate frame sections 32 and 34 secured between the rear beam 24 and the front beam 30 in parallel relations spaced equidistantly from the center line 36 of the platform. Each of the sections 32 and 34 consists of a vertical leg 38 and a forward leg 40 as best shown in FIGS. 3 and 5.

In addition to a cutter assembly shown at 42 disposed along the forward edge of the beam 30, the platform will include a reel and suitable conveyors (not shown) so that the crop can be cut, consolidated into a marrow mass or stream, and deposited onto the ground in a windrow.

These crop treating components are power driven from an engine on the chassis. A portion of the system for driving the cutter and the reel is shown schematically in FIG. 1. An input shaft 44 is supported from the beam 24 for driving a pitman 46 and a belt drive assembly 48 for operating the cutter 42 and reel respectively. These drive systems are disposed at one end of the platform and thus contribute to disposing the center of gravity (shown at 50) of the platform at a point transversely spaced from the platform center line 36. This asymmetrical disposition of the center gravity 50 creates problems in mounting and floatably suspending the platform from the chassis.

In accordance with the invention a linkage and suspension system is provided by which the platform 12 is supported from the self-propelled chassis 10. A ball joint connection shown generally at 52 pivotally connects the platform beam 24 to the box frame section 17 on the center line 36 of the platform. Details of the connection 52 are shown in FIGS. 2 and 4. A pair of generally triangular gusset plates 54 and 56 is welded to the beam 24 and extend rearwardly in spaced relation. A pair of vertical plates 58 and 60 is secured between the plates 54 and 56 to define a rigid box-like structure therewith. The gusset plates 54 and 56 may include a rearwardly opening cutout portion shown at 62 disposed between the rearward ends of the vertical plates 58 and 60.

A pair of angle members 64 and 66 is welded to the forward side of the frame section 17 in spaced apart relation to receive a plate 68 secured therebetween by bolts 70. The plate 68 projects forwardly into the area defined by the cutout 62 between the plates 58 and 60. An annular socket 72 is welded in the plate 68 and provides a seat for a ball 74 shown best in FIG. 4. A bolt 76 extends through the plates 58 and 60 and the ball 74 as shown, to thus hold the connection in assembled relation.

From the description of the ball and socket connection 52, it will be seen that the connection defines a plurality of axes about which the platform could move relative to the chassis. Among these axes are a transverse pivot axis 78 and a longitudinal pivot axis 80 which intersect at the center of the connection 52. The longitudinal axis 80 is in the same vertical plane as the platform center line 36.

In order to further support the platform 12 and also to selectively raise and lower the same about the transverse axis 78, there is provided a pair of hydraulic piston-cylinder units 82 and 84. Since the units are identical a description of one will suffice for both. Each unit includes a cylinder 86 pivotally connected by a pin 88 to the lower end of the plate 18. A piston rod 90 projects forwardly from the cylinder 86 and is pivotally connected to the platform leg 40 by a pin 92. It will be seen that the leg 40 is of channel section, with the pin 92 extending through a pair of mounting plates 94 and 96 welded within the channel section. It will thus be seen that the simultaneous extension and retraction of the piston-cylinder units 82 and 84 will raise and lower the platform 12 about the transverse pivot axis 78 of the ball and socket connection 52. Of course, the units 82 and 84 are actuated by pressure fluid supplied from a hydraulic system incorporated into the self-propelled chassis 10.

In order to provide floatability of the platform during a harvesting operation, each of the piston-cylinder units 82 and 84 has a spring system associated therewith which is effective to support the platform for movement about the connection 52 in response to changes in ground contour. An elongated coil spring 98 is disposed co-axially about each unit 82 and 84. The spring 98 is interposed between a bracket 100 secured on the cylinder 86 and another bracket 102 on the piston rod 90. In practice the bracket 102 is secured on the forward end of a cylindrical sleeve 104 which encloses the piston rod 90 and cylinder 86 as shown. The sleeve 104 serves to prevent crop material, dust, and the like from accumulating on the piston rod 90 and thus entering the cylinder 86 and hydraulic fluid therein. If desired, a sleeve of larger diameter than sleeve 104 can be substituted therefor so as to be disposed about the spring 98.

The amount of compressive force exerted by the spring 98 can be adjusted. The bracket 102 seats against a nut 106 threadedly received on the forward portion of the piston rod 90. Accordingly the compressed length of the spring 98 can be varied by turning the nut 106.

Means are provided to restrain the platform against movement in a horizontal plane about vertical axes through the connection 52, while at the same time permitting so-called "radial" float about the axis 80 and vertical movement about the axis 78. As shown generally in FIG. 1 and more specifically in FIGS. 2 and 5, a stabilizer bar 108 is pivotally connected at its rearward end to the plate 19 and at its forward end to the platform by ball joints 110 and 112 respectively. The ball joint 110 is mounted within a channel-shaped bracket 114 welded to the top of the plate 19. The forward ball joint 112 is mounted between a right-angle plate 116 and a strap 118 welded to the beam 24 and vertical leg 38 respectively. It will be seen in FIG. 2 that the ball joint 112 is disposed on the transverse pivot axis 78.

Means are provided for offsetting or compensating for the asymmetrical center of gravity of the platform. As shown generally in FIG. 1 and more specifically in FIGS. 2 and 3, a balancing spring 120 is connected between the chassis 10 and the platform 12 on the same side of the center line 36 as is the center of gravity 50. The spring 120 is pivotally connected at its lower end to a bracket assembly 122 bolted to the leg 38 of the platform. The upper end of the spring 120 is threadedly connected to an adjustment bolt 124 received through a trunnion 126 pivoted on a bracket assembly 128. The bracket assembly 128 is bolted to the plate 18 so as to dispose the trunnion 126 on the pivot axis 78.

In operation, the platform is movable vertically about the axis 78 between lower operative positions and a raised transport position in response to extension and retraction of the cylinder units 82 and 84. When the platform is in the lower operative position, the units 82 and 84 are exhausted of pressure fluid and the platform is floatably supported by the springs 98. The platform can pivot about the axes 78 and 80 to accommodate itself to changing ground contour. The stabilizer bar 108 permits these movements required for floatability, but restricts undesired swinging movement in a horizontal plane about vertical axes through the connection 52. The effective length of the springs 98 can be adjusted by the nuts 106 to select the optimum force for supporting the platform.

The balancing spring 120 creates a lifting force on the platform which offsets the effect of the assymetrical center of gravity. Accordingly the platform will remain substantially level during raising and lowering and will engage level ground with uniform force at both ends. The amount of force exerted by the spring 120 can be varied by adjusting the bolt 124.

By the foregoing, it will be seen that the suspension and linkage system of the invention provides a simple and effective means for supporting a harvesting platform in accordance with the objects of the invention.

What is claimed is:

1. In a crop harvester including a mobile frame and a crop harvesting platform forwardly of said frame elongated transversely to the forward direction of travel of the harvester, said platform having its center of gravity disposed at a point transversely spaced from the fore-and-aft extending centerline of said platform, a system for floatably supporting said platform from said frame comprising:

support means at said centerline pivotally mounting said platform on said frame in load-supporting relation, said support means defining a longitudinal pivot axis for pivotal movement of said platform relative to said frame on the same vertical plane as said centerline and a transverse pivot axis for pivotal movement of said platform relative to said frame, said transverse pivot axis intersecting said longitudinal axis at right angles thereto;

power lift means connected between said frame and said platform for raising and lowering said platform about said transverse pivot axis;

spring means for floatably supporting said platform for pivoting movement relative to said frame abouts said transverse axis and said longitudinal axis;

stabilizer means connected between said frame and said platform for resisting movement of said platform about axes other than said transverse and longitudinal axes; and a spring connected between said frame and said platform for creating a force offsetting the effect of the asymmetrical center of gravity.

2. The subject matter of claim 1, including means for adjusting the length of said spring to selectively vary said force.

3. The subject matter of claim 1, wherein said stabilizer means is connected to said platform on said transverse pivot axis.

4. The subject matter of claim 1, wherein said spring is connected to said frame on said transverse pivot axis.

5. The subject matter of claim 1, wherein said stabilizer means is connected to said platform on said transverse pivot axis and said spring is connected to said frame on said transverse pivot axis.

6. In a crop harvester including a mobile frame and a crop harvesting platform forwardly of said frame elongated transversely to the forward direction of travel of the harvester, said platform having its center of gravity disposed at a point transversely spaced from the fore-and-aft extending centerline of said platform, a system for floatably supporting said platform from said frame comprising:

support means at said centerline pivotally mounting said platform on said frame in load-supporting relation, said support means defining a longitudinal pivot axis for pivotal movement of said platform relative to said frame in the same vertical plane as said centerline and a transverse pivot axis for pivotal movement of said platform relative to said frame, said transverse pivot axis intersecting said longitudinal pivot axis at right angles thereto;

power lift means connected between said frame and said platform for raising and lowering said platform about said transverse pivot axis;

spring means for floatably supporting said platform for pivoting movement relative to said frame about said transverse axis and said longitudinal axis;

stabilizer means connected between said frame and said platform and spaced transversely from said centerline on an opposite side thereof from the center of gravity for resisting pivotal movement of said platform in a horizontal plane while permitting pivotal movement about said transverse and longitudinal axes;

and a balancing spring connected to said frame on said transverse pivot axis and extending downwardly into pivotal connection with said platform in transversely spaced relation to said centerline on the same side thereof as the center of gravity for creating a lifting force offsetting the effect of the asymmetrical center of gravity.

7. The subject matter of claim 6, wherein said spring means are disposed coaxially with said power lift means.

8. The subject matter of claim 6, including means for adjusting the length of said balancing spring to selectively vary said lifting force.

9. In a crop harvester including a mobile frame and a crop harvesting platform forwardly of said frame elongated transversely to the forward direction of travel of the harvester, said platform having its center of gravity disposed at a point transversely spaced from the fore-and-aft extending centerline of said platform, a system for floatably supporting said platform from said frame comprising:

a ball joint connection on said frame pivotally coupling said platform thereto in load-supporting relation on said centerline at the upper rear portion of said platform, said ball joint connection defining a longitudinal pivot axis and a transverse pivot axis for pivotal movement of said platform relative to said frame;

a pair of hydraulic piston-cylinder units pivotally mounted on said frame and extending forwardly on opposite sides respectively of said centerline into respective pivotal connections with the underside of said platform, said units being operative to raise and lower said platform about said transverse pivot axis in response to extension and retraction respectively of said units;

a pair of spring assemblies connected between said frame and said platform on opposite sides respectively of said centerline for yieldably supporting said platform for pivotal movement relative to said frame about said axes;

a stabilizer bar pivotably connected at its rearward end to said frame and extending forwardly into pivotal connection with said platform on said transverse pivot axis in transversely spaced relation to said centerline for resisting pivotal movement of said platform about axes other than said transverse and longitudinal axes;

and a spring connected to said frame on said transverse axis and extending downwardly into connection with said platform on the same side of the centerline as the center of gravity for creating a lifting force offsetting the effect of the asymmetrical center of gravity.

* * * * *